UNITED STATES PATENT OFFICE.

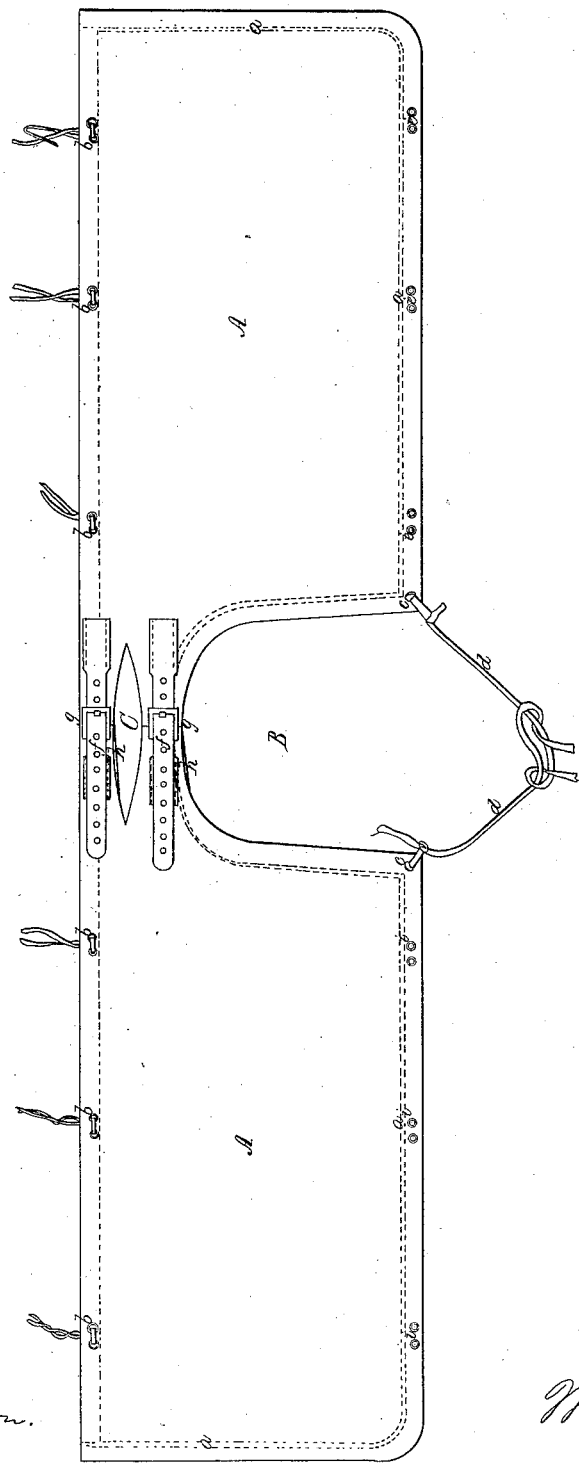

WILLIAM B. JOHNS, OF GEORGETOWN, DISTRICT OF COLUMBIA.

IMPROVEMENT IN SADDLE-LEGGINS.

Specification forming part of Letters Patent No. 33,996, dated December 24, 1861.

*To all whom it may concern:*

Be it known that I, WILLIAM B. JOHNS, of Georgetown, in the county of Washington and District of Columbia, have invented a new and improved article of manufacture to be attached to a saddle and serve as "leggins" to protect the rider's legs from rain and mud and also to cover the saddle and protect the horse when the rider has dismounted; and I do hereby declare that the following is a full and exact description thereof, reference being had to the accompanying drawing, making part of this specification, and representing a top view of the article spread out.

The article is composed of two pieces or flaps A A, of india-rubber cloth, oil-cloth, or other suitable water-proof material, of the proper size to reach down over the saddle on each side and cover the rider's legs and feet and of the shape substantially as represented in the drawing, so that when joined together at their upper ends they leave an intermediate space B in the rear edge large enough to admit the body of the rider. They are connected together at the front edge by straps and buckles $f f$, as shown, or by any equivalent means, so as to draw them up closer together or let them out. One overlaps the other somewhat, as from $g g$ to $h h$, to admit of this drawing up and letting out at pleasure. By this means the flaps A A are adjusted in length to the size of the saddle or of the rider. Between the straps $f f$ there is also an opening C for the pommel of the saddle to project up through and so as not to be in the way of the holster-straps of army saddles. The pommel holds the leggins on the saddle; but to secure them firmly thereon and to hold them down over the legs securely there are eyelets and strings or cords $b b$ in the front edge for the purpose of securing the same to the saddle, there being holes in the front edge thereof to tie the cords in. The two extreme or lower cords—one on each side, respectively—are fastened to the stirrup-straps, thus holding the lower ends of the leggins down over the feet. Instead of the eyelets and cords, buttons and button-holes or any equivalent means of fastening may be employed.

To the upper back corners $c c$ of the flaps A A cords $d d$ are attached for securing the leggins around the back of the body of the rider by simply tying them together or other mode of readily fastening and unfastening when occasion requires. It should not be very strongly secured here in order not to bind the rider too firmly in his seat in case of accident. The back edges of the leggins naturally draw closely around the legs and require nothing to hold them down; but I make eyelet-holes $i i$ (or equivalent means of fastening) in the back edges of the flaps A A, which may be used for this purpose, but are intended more especially for the purpose of uniting those two edges of the flaps together, and thus forming a cover to protect the saddle and horse from the weather when the rider is not mounted. It thus may serve also as a blanket for the horse or be useful in other ways as a protection from cold and rain.

A cord $a$ is inserted in the cloth near the edges to strengthen and stiffen the same.

I do not confine myself to precisely the construction described above, but intend to vary any portion as may be desirable, while retaining the substantial features of the invention.

This invention will be found to be a great improvement on the ordinary leggins, since they do not confine the legs so closely, are more comfortable, and do not require to be put on and taken off or be worn when the rider is not mounted, and to these advantages are to be added the other uses to which they are applicable, as above described.

The invention is very well adapted to army use, not only for mounted officers, but for general cavalry use, for teamsters, and all mounted men.

Having thus described my invention, what I claim, and desire to secure by Letters Patent as a new article of manufacture, is—

Constructing the leggins with the adjustable openings C and B to be attached to the saddle and retained upon the person, in the manner and for the purpose substantially as specified.

In witness that the above is a true specification of my improved saddle-leggins and cover I hereunto set my hand this 23d day of October, 1861.

WM. B. JOHNS.

Witnesses:
J. S. BROWN,
EDM. F. BROWN.